United States Patent
Montoya et al.

(10) Patent No.: US 11,139,950 B2
(45) Date of Patent: Oct. 5, 2021

(54) SHIFT REGISTER PROTECTED AGAINST PHYSICAL ATTACKS

(71) Applicant: COMMISSARIAT A L'ENERGIE ATOMIQUE ET AUX ENERGIES ALTERNATIVES, Paris (FR)

(72) Inventors: Maxime Montoya, Grenoble (FR); Simone Bacles-Min, Grenoble (FR); Jacques Fournier, Grenoble (FR); Anca Molnos, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 273 days.

(21) Appl. No.: 16/509,075

(22) Filed: Jul. 11, 2019

(65) Prior Publication Data

US 2020/0021427 A1 Jan. 16, 2020

(30) Foreign Application Priority Data

Jul. 12, 2018 (FR) ..................... 18 56431

(51) Int. Cl.
*H04L 9/00* (2006.01)
*G06F 21/75* (2013.01)

(52) U.S. Cl.
CPC ............. *H04L 9/004* (2013.01); *G06F 21/75* (2013.01)

(58) Field of Classification Search
CPC ....... H04L 9/004; H04L 9/0662; H04L 9/003; H04L 2209/34; G06F 21/75
See application file for complete search history.

(56) References Cited

U.S. PATENT DOCUMENTS

| | | | |
|---|---|---|---|
| 6,785,389 B1 * | 8/2004 | Sella | H03K 3/84 365/78 |
| 10,741,212 B2 * | 8/2020 | Kim | H03M 13/6575 |
| 2010/0272209 A1 * | 10/2010 | Lee | H03M 13/6516 375/295 |
| 2017/0228562 A1 * | 8/2017 | Guilley | H04L 9/002 |

FOREIGN PATENT DOCUMENTS

FR  3 004 036  10/2014

OTHER PUBLICATIONS

French Preliminary Search Report dated May 13, 2019 in French Application 18 56431 filed on Jul. 12, 2018 (with English Translation of Categories of Cited Documents).

(Continued)

*Primary Examiner* — Alexander Lagor
*Assistant Examiner* — Vu V Tran
(74) *Attorney, Agent, or Firm* — Oblon, McClelland, Maier & Neustadt, L.L.P.

(57) ABSTRACT

The present invention relates to a shift register protected against physical attacks, comprising a coding module, a decoding module, a plurality of basic shift registers of which the respective inputs receive the bits of a codeword supplied by the coding module using an input bit at each clock cycle, and of which the respective outputs are connected to the decoding module in order to supply an output bit, with the codewords being chosen in such a way as to have the same non-zero Hamming weight and two successive codewords having a constant non-zero Hamming distance. The codewords are generated using an internal state machine and/or an external state machine to the coding module.

9 Claims, 8 Drawing Sheets

(56) References Cited

OTHER PUBLICATIONS

Sandeep Kumar, et al., "Some Thoughts about Implementation Properties of Stream Ciphers", https://www.ei.ruhr-uni-bochum.de/media/crypto/veroeffentlichungen/2011/01/28/sasc klp.pdf, Jan. 28, 2011, 9 pages.

Maghrebi Houssem, et al., "There Is Wisdom in Harnessing the Strengths of Your Enemy: Customized Encoding to Thwart Side-Channel Attacks", International Association for Cryptologic Research, Jul. 20, 2016, 21 pages.

Matthew Mayhew, et al., "An overview of hardware-level statistical power analysis attack countermeasures", J Cryptogr. Eng, vol. 7, No. 3, 2017, 20 pages.

Sanjay Burman, et al., "LFSR Based Stream Ciphers Are Vulnerable to Power Attacks", INDOCRYPT'07 Proceedings of the cryptology 8th International Conference on Progress in Cryptology, 2007, 9 pages.

U.S. Appl. No. 15/510,425, filed Mar. 10, 2017, 2017/0310688 A1, Lecomte, M., et al.

U.S. Appl. No. 16/054,291, filed Aug. 3, 2018, 2019/0045442 A1, Montoya, M., et al.

U.S. Appl. No. 16/127,390, filed Sep. 11, 2018, 2019/0081786 A1, Loiseau, A., et al.

\* cited by examiner

SHIFT REGISTER PROTECTED AGAINST PHYSICAL ATTACKS

TECHNICAL FIELD

The present invention generally relates to the field of protecting integrated circuits from physical attacks, in particular the protecting of integrated encryption circuits used in cryptography.

Prior Art

The integrated circuits intended to process confidential data and especially integrated encryption circuits must be protected against the techniques of cryptanalysis.

There is a distinction between conventional (or theoretical) cryptanalysis and cryptanalysis via physical attacks. Conventional cryptanalysis consists in observing encrypted data and in attempting to recover via a differential or algebraic analysis the unencrypted data. Physical attacks are all of the techniques that make use of the operation of the encryption circuit to recover the unencrypted data. Unlike conventional cryptanalysis, physical attacks do not aim to attack the encryption algorithm itself but its software or hardware implementation.

Two major families of hardware physical attacks are generally distinguished, namely observation attacks (or by side channels) and fault injection attacks. Observation attacks or side channel analysis (SCA) are based on the observation of the circuit during the execution of the calculations linked to the encryption. This observation in practice results in physical measurements (current consumption, electromagnetic trace, calculation time, etc.). Fault injection attacks (FIA) make use of the effect of an intentional disturbance on the operation of the circuit, in particular to get around protections or reduce the mathematical complexity of the decryption. The disturbance in the operation of the circuit can be induced for example by means of an electromagnetic probe or a laser, or via modulation in the power supply voltage or in the operating frequency of the circuit.

It is rather easy to conduct side channel or fault injection attacks on shift registers, these attacks making it possible to determine the data present in such registers. However, shift registers are used in the hardware implementations of many cipher algorithms, in particular in the stream cipher algorithms such as Trivium or Enocoro (standardized in ISO/IEC29192-3: 2012), but also in hash algorithms, for the generating of random numbers, or simply for data storage.

Figure 1:
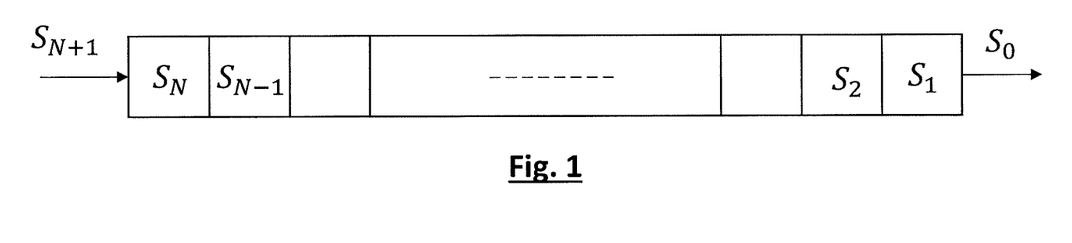
FIG. 1 diagrammatically shows a shift register that is not protected against physical attacks.

An unprotected shift register is diagrammatically shown in FIG. 1. The internal state of the register is given by the N bits $S_1, \ldots, S_N$ stored in the N memory cells (or more simply "cells") of the register, with each cell generally being carried out via a simple flip-flop. It is considered that at each new clock cycle Clk a new bit arrives as input of the register and that each bit of the internal state is shifted by one bit towards the output.

To conduct a side channel attack, an attacker can make use of the Hamming weight and/or the Hamming distance. Recall that the Hamming weight of a binary word is defined by the number of bits that have the value "1" in this word, and that the Hamming distance between two words (of the same size N) is equal to the number of bits where these two words differ. By extension the Hamming distance of a word $S_1, \ldots, S_N$ is defined as the distance between the words (of size N−1) $S_1, \ldots, S_{N-1}$ and $S_2, \ldots, S_N$. In other words, the Hamming distance of a word is equal to the number of switchings between two successive bits of this word. Thus, it will be understood that a register that contains only "1" will correspond to a zero Hamming weight N and Hamming distance and that a register wherein the successive bits alternative will correspond to a Hamming weight N/2 and a Hamming distance of N−1 (N if the input bit is considered).

The Hamming weight and the Hamming distance are easily obtained from the static consumption and the dynamic consumption of the shift register.

Currently, there is no simple countermeasure adapted to shift registers, effectively targeting fault injection and/or side channel attacks.

The countermeasures intended to ward off fault injection attacks generally make use of a spatial redundancy (duplication of circuits and operations carried out in parallel), or of a temporal redundancy (repetition of operations several times), and even of a redundancy of the information itself by means of error detecting codes (CRC) or error correcting codes (ECC). In any case, this redundancy makes it possible to determine if errors have been introduced and therefore to check the integrity of the data.

The countermeasures intended to ward off side channel attacks are diverse. A general presentation of them can be found in the article by M. Mayhew et al. entitled "*An overview of hardware-level statistical power analysis attack countermeasures*" published in J. Cryptogr. Eng., vol. 7, no. 3, pp 213-244, September 2017. Some of these countermeasures are based on a principle of compensating the consumption of the circuit, in such a way that the latter remains constant over time.

However, the compensation of the consumption is specific to each circuit and therefore requires substantial design effort for each new circuit, requiring the use of specialized tools and libraries. Furthermore, it assumes that all of the components and parasitic elements of the circuit (capacitors, resistors) are compensated for so that the different paths are current balanced. Finally, the extra cost in terms of surface, consumption and losses in performance is generally substantial.

A countermeasure intended to ward off side channel attacks against a shift register was proposed in the article by S. Burman et al. entitled "*LFSR based stream cipher are vulnerable to power attacks*" published in INDOCRYPT 2007 Proc., pp. 384-392.

The protected circuit is in fact a linear feedback shift register (LFSR) that can be used in the context of a stream cipher. Recall that a stream cipher is produced by adding bit by bit a key stream cipher to the sequence of bits of the unencrypted message. This key stream is generally generated using m outputs of an LFSR register where m≤N is the number of feedback measurements corresponding to the non-zero coefficients of an N-degree primitive polynomial (even the outputs of several LFSR registers) with said outputs able to be combined using a non-linear element.

Figure 2:
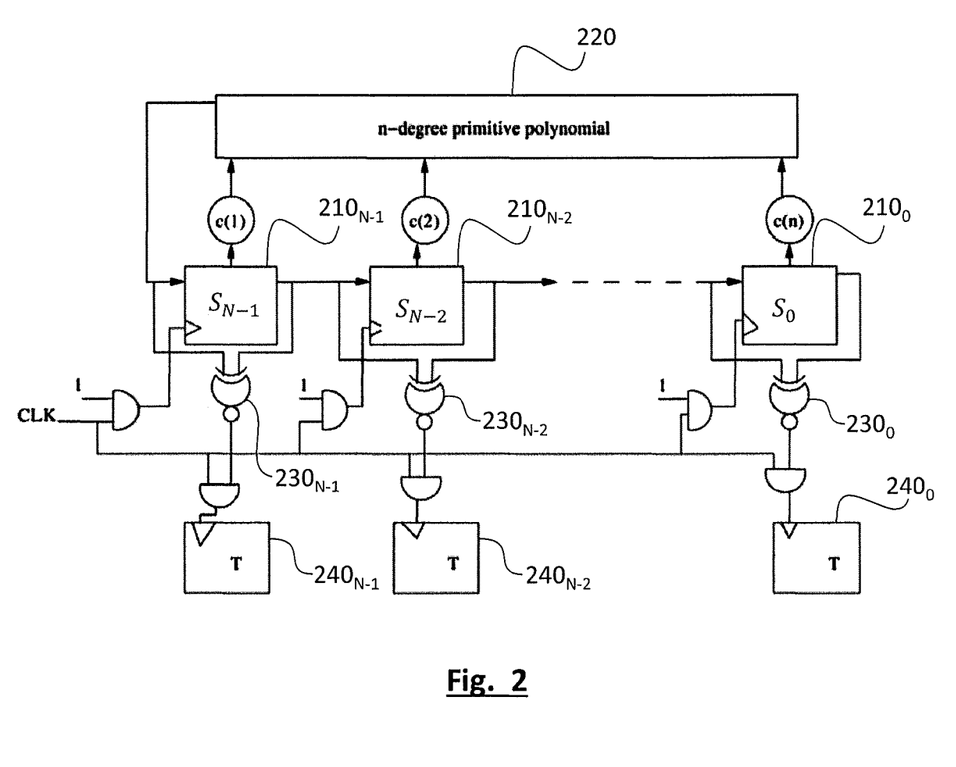
FIG. 2 shows a shift register protected against physical attacks via side channels, known from the prior art.

FIG. 2 diagrammatically shows an LFSR register protected against side channel attacks. It comprises N cells (flip-flop) $210_0, \ldots, 210_{N-1}$, containing the bits $S_0, \ldots, S_{N-1}$ and a feedback loop 220 of which the coefficients are those of a primitive polynomial.

The protection is provided by compensation flip-flops $240_0, \ldots, 240_{N-1}$, and the logic gates $230_0, \ldots, 230_{N-1}$. When a flip-flop $210_n$ switches, the associated flip-flop $240_n$ does not switch and inversely, which guarantees a constant number of switchings in the circuit at each clock cycle.

Note however that the countermeasure proposed is effective only against side channel attacks based on the Hamming distance. It would however be ineffective against side channel attacks based on the Hamming weight.

The object of the present invention is consequently to propose a countermeasure that makes it possible to protect a shift register against the various types of side channel attacks and, in an advantageous embodiment, to protect this register from both side channel and error injection attacks.

DISCLOSURE OF THE INVENTION

The present invention is defined by a shift register protected against physical attacks, comprising a coding module receiving input bits and encoding, at each clock cycle, an input bit ($b_{in}$) into a codeword of size K>1, a plurality K of basic shift registers each comprising the same number N>2 of memory cells, with each basic shift register receiving as input one bit ($S_n^k$) of the codeword and supplying one bit of a word to be decoded of size K in order to generate one output bit ($b_{out}$), with the codewords being chosen in such a way as to all have the same non-zero Hamming weight and each pair of consecutive codewords having the same non-zero Hamming distance.

The encoding implemented by the coding module can be a systematic coding, with the output bit being the systematic bit of the word to be decoded and being supplied by one of the basic registers.

According to an alternative, the shift register further comprises a decoding module of which the inputs are connected to the respective outputs of the K basic shift registers, and decoding the word to be decoded in order to supply the output bit, with each state being associated with a codeword, the state machine passing at each clock cycle from a current state to a following state according to the current state and the input bit, with the codeword generated by the coding module being the one associated with the following state.

According to a first embodiment, the shift register can further comprise an external state machine, clocked by said clock and cyclically running through a sequence of states, with the codeword generated by the coding module being a function of the input bit and of the current bit of the state machine.

The external state machine can in particular be carried out by a synchronous binary counter. The counter can provide a parity in the number of clock cycles using an initialization instant, with the codeword generated by the coding module being a function of the input bit and of said parity.

When the decoding module is present, if it determines that the word to be decoded is not a codeword, it generates an error signal.

The invention also relates to a stream cipher circuit, comprising at least one shift register as indicated hereinabove, the basic shift register corresponding to the systematic bit comprising a linear feedback by means of coefficients of a primitive polynomial, with the bit resulting from the linear feedback being used as an input bit for the coding module, with the bits stored in the basic shift register corresponding to the systematic bit, or only some of them, being combined in a non-linear combination module in order to supply a key stream cipher, with a sequence of bits ($a_1, \ldots, a_N$) to be encrypted being added to the key stream cipher ($d_1, \ldots, d_N$) in order to supply a stream cipher sequence ($a_1^*, \ldots, a_N^*$).

BRIEF DESCRIPTION OF THE DRAWINGS

Other characteristics and advantages of the invention shall appear when reading a preferred embodiment of the invention, described in reference to the accompanying figures among which.

DETAILED DISCLOSURE OF PARTICULAR EMBODIMENTS

We shall consider in what follows a shift register comprising a plurality N≥2 of memory cells, to be protected against the physical attacks described hereinabove. Such a register can for example be an integral part of a stream cipher circuit to be protected as we shall see further on.

The idea at the base of the invention is to provide a plurality K>1 of basic shift registers in parallel and to code each input bit into one word of K bits, with the bits of this word being respectively supplied to the inputs of these basic shift registers. The shift register to be protected can be seen as any one of the basic shift registers.

Figure 3:
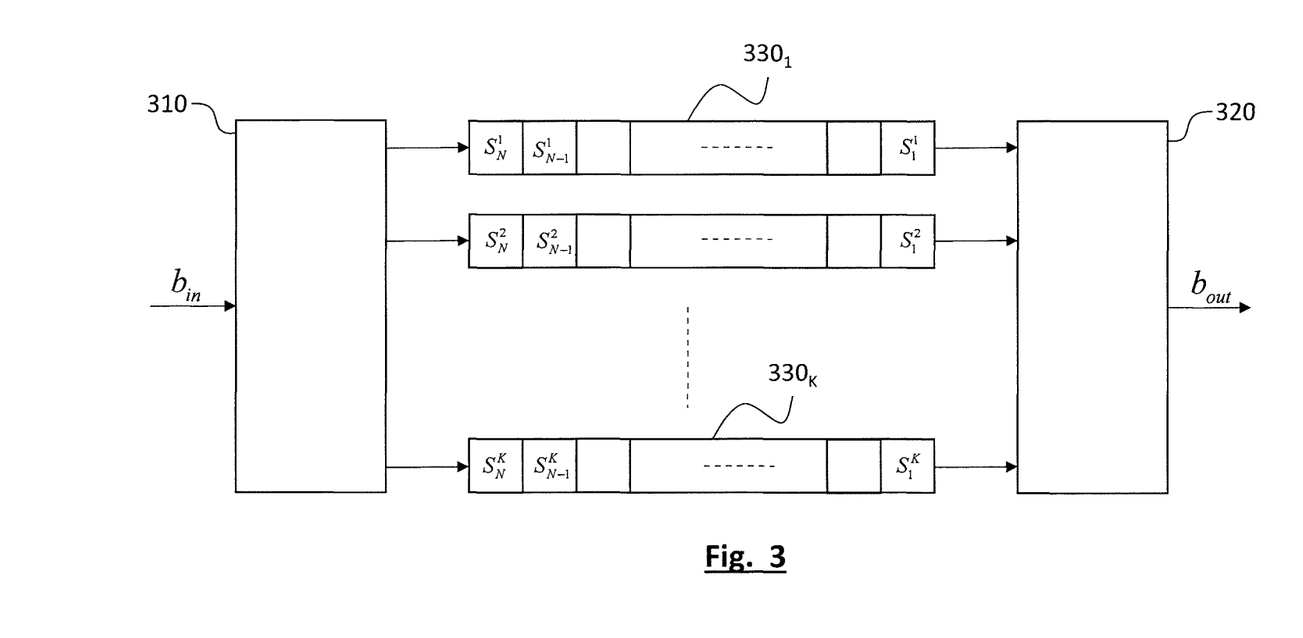
FIG. 3 shows a shift register protected against physical attacks according to a first embodiment of the invention.

FIG. 3 shows a shift register protected against physical attacks according to a first embodiment of the invention.

The shift register protected against physical attacks is implemented in the form of a plurality K of basic registers $330_1, \ldots, 330_K$, controlled by the same clock, Clk. At each clock cycle, a new input bit is supplied to the coding module, 310, in order to generate a codeword of K bits, with each one of the K outputs of the coding module being connected to the input of a basic register. Thus, at each clock cycle, one bit of the codeword is supplied to a basic shift register. The bits at the output of the basic shift registers, $330_1, \ldots, 330_K$, are supplied in parallel in the form of a word of K bits which is decoded by the decoding module 320 in order to supply an output bit.

According to a first alternative, the coding of the input bit by the coding module can depend on the state of an external state machine, clocked by the clock Clk and cyclically running through a sequence of states. According to a second alternative, wherein the encoder (coding module) is itself a state machine, the coding of the input bit will depend on the state of the encoder, such as resulting from the preceding coding operation. According to a third alternative, the coding of the input bit by the coding module will depend on both a first state of an external state machine and on a second state of an internal state machine.

Regardless of the alternative considered, the set of all the codewords, in other words the dictionary of the code, is only comprised of words that have the same non-zero Hamming weight. Furthermore, the Hamming distance between any two successive codewords is chosen as constant, non-zero, in other words the number of binary switchings at each clock cycle is identical and non-zero. Thus, the same input bit value will be coded differently in two successive instants.

In the first alternative, the external state machine can be carried out by means of a synchronous binary counter, and even in its simplest implementation by a flip-flop DQ looped onto itself ($\overline{Q}$ on D) so as to perform a division of the frequency by 2. In this latter case, the coding of the input bit will simply depend on the parity P of the number of clock cycles from an initialization instant.

A first example of such a coding of an input bit b for K=4 is given by the coding table hereinafter:

TABLE I

|       | P = 0 | P = 1 |
|-------|-------|-------|
| b = 0 | 0001  | 0010  |
| b = 1 | 0100  | 1000  |

It is indeed checked that all of the codewords have the same Hamming weight (here 1) and that two successive codewords have the same Hamming distance (equal to 2).

Figure 4:
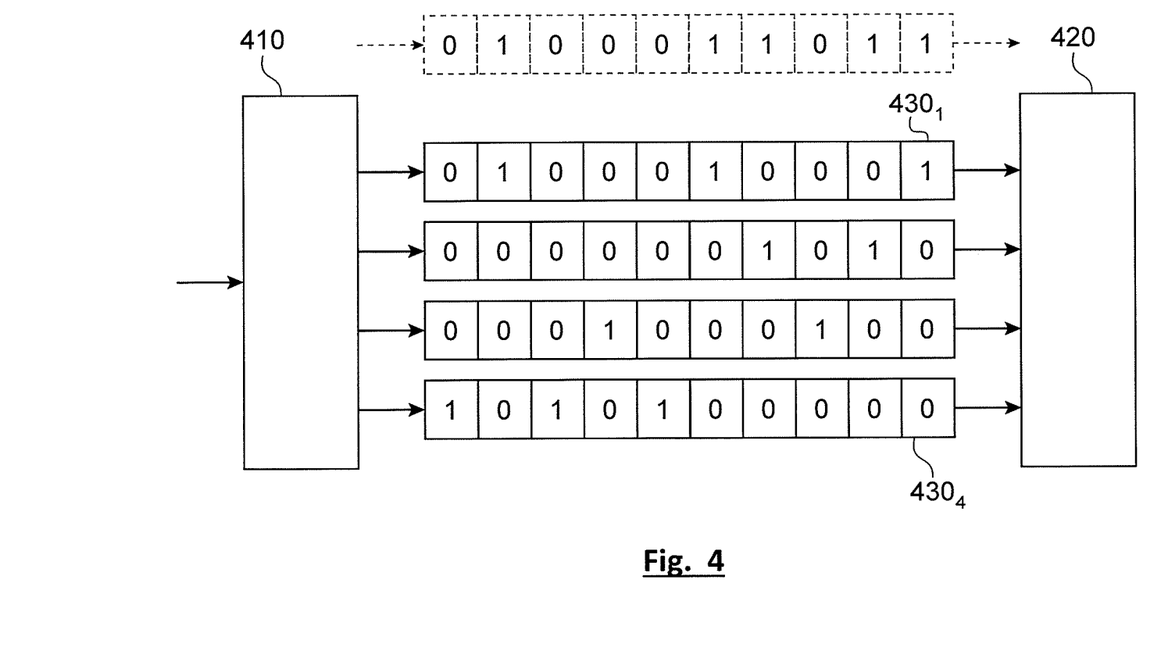
FIG. 4 shows a first example of a shift register according to FIG. 3.

FIG. 4 shows an example of a protected shift register wherein the coding module uses the coding table hereinabove. The top of the figure shows, as a dotted line, the equivalent unprotected shift register. In this figure, the first clock cycle, corresponding to $S_1^1, \ldots, S_1^K$ is assumed to have an odd parity (P=1).

The decoding module decodes at each clock cycle the word formed by the K bits at the output of the basic shift registers, by using the dictionary of the code. If the word in question is not part of the dictionary of the code, an error is detected and reported. Thus, in the case of the example of the protected register shown in FIG. 4, if the word to be decoded has two bits or more equal to "1", or no bit equal to 1, an error will be detected and reported.

An attacker who wants to inject a fault into the circuit without the latter being detected will have to simultaneously inject a fault at the same position and in two different basic registers. He will furthermore have to inject this fault over exactly one bit per basic register, otherwise an unknown state will be generated. Finally, the attacker will have to have access to the parity P in order to carry out this insertion. The combination of these three conditions is very difficult to produce. In particular, it is much more difficult to conduct an attack conducted against a countermeasure known from prior art, based on simple spatial redundancy.

As indicated hereinabove, according to a second alternative, the coding module can operate itself as a state machine, in other words each clock cycle switches the machine to a new state, according to the preceding state and the binary value of the input bit (such a state machine will be referred to as "internal"). The description of the transitions between states, according to the input bits is given by a state diagram. Each state corresponds to a codeword of K bits, with these K bits being supplied to the K respective inputs of the basic shift registers.

The codewords associated with the various states are chosen in such a way as to all have the same non-zero Hamming weight and such that each pair of successive codewords has the same non-zero Hamming distance.

The decoding module is based on the same state diagram as the coding module: using two successive states, this module determines the binary value that corresponds to the transition from one to the other, and supplies this value as an output bit.

Figure 5:
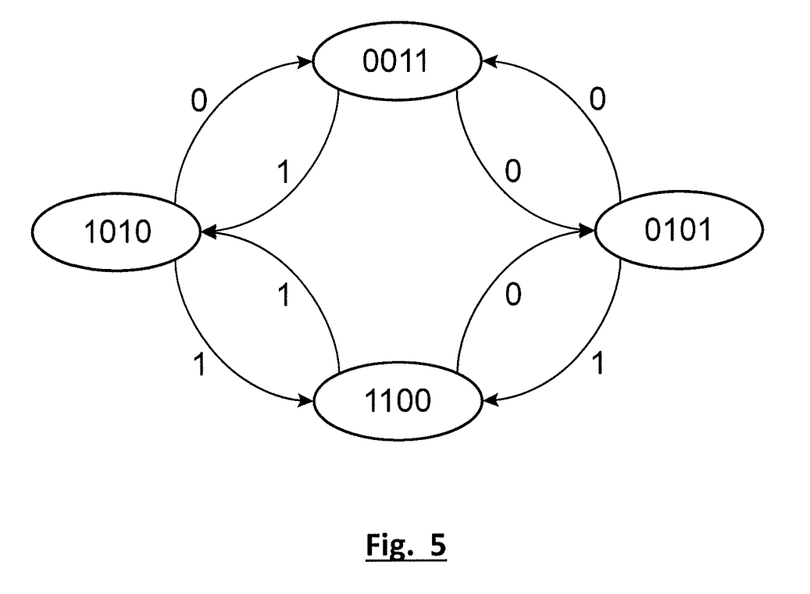
FIG. 5 shows an example of a state diagram for the coding module of FIG. 3.

FIG. 5 shows an example of a state diagram for the coding module of FIG. 3. The binary values associated with the edges of the graph correspond to the possible values of the input bit of the coding module.

Figure 6:
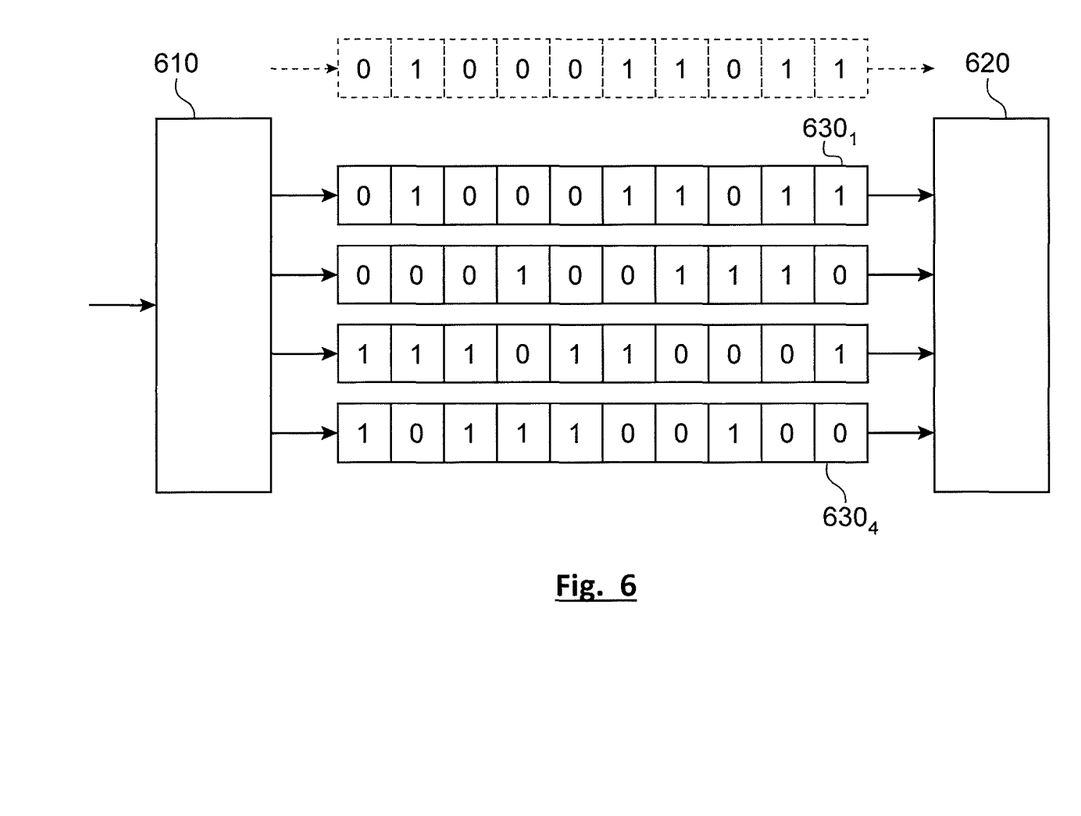
FIG. 6 shows a second example of a shift register according to FIG. 3, using the state diagram of FIG. 5.

FIG. 6 shows a second example of a shift register according to FIG. 3, using the state diagram of FIG. 5.

The top of the figure shows, as a dotted line, the equivalent unprotected shift register. The coding module is shown in 610 and the one for decoding in 620. The basic shift registers are shown in $630_1, \ldots, 630_4$.

It was assumed here that the initial state of the state machine was 1010. This state is supplied as a first codeword $S_1^1, \ldots, S_1^K$ to the K basic shift registers. The arrival of the first bit of value "1" switches the encoder from the state 1010 to the state 1100. This codeword, $S_2^1, \ldots, S_2^K$, is supplied to the basic shift registers. The second bit of value "1" switches the encoder from the state 1100 to the state 1010. This codeword $S_3^1, \ldots, S_3^K$ is supplied to the basic shift registers and so on.

In this example, the Hamming weight of the various codewords is equal to 2 and the Hamming distance between two successive words of the code is equal to 2.

In the same way as hereinabove, if an output word $S_n^1, \ldots, S_n^K$ does not belong to the dictionary of the code, the decoding module 620 will detect an error and will be able to report it.

More generally, in a third alternative, the coding of the input bit can be carried out according to the state of a first external state machine, such as a counter, and of the state of a second internal state machine. The transitions between the internal states can then depend on both the external state (for example on the portion P of the clock cycle counter) and on the bit as input of the coding module. This results in a double indexing of the state diagram of the second state machine.

Figure 7:
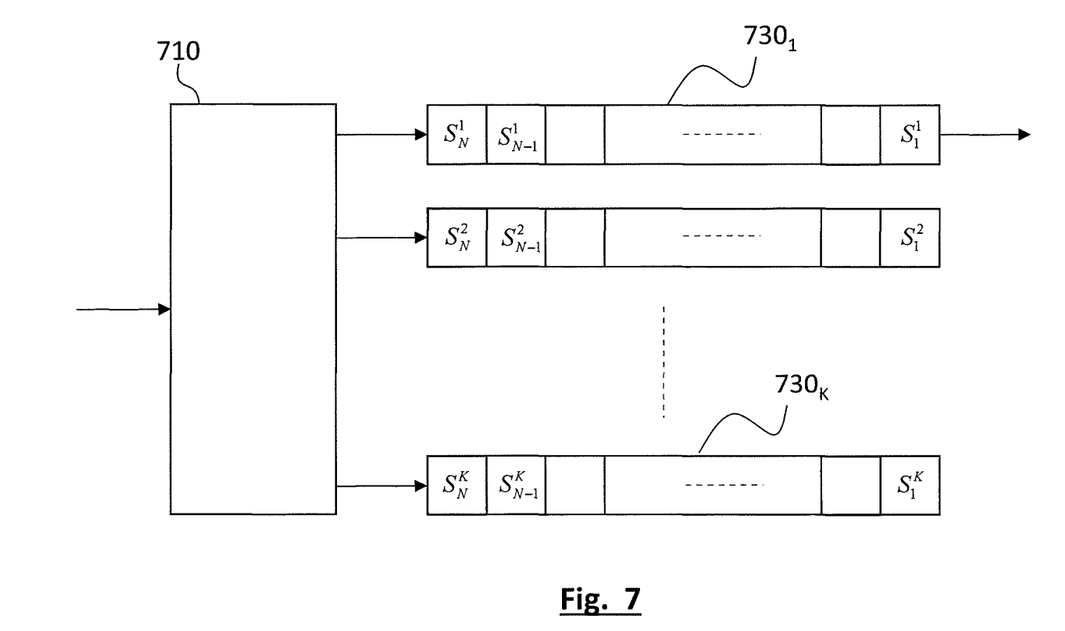
FIG. 7 shows a shift register against physical attacks according to a second embodiment of the invention.

FIG. 7 shows a shift register protected against physical attacks according to a second embodiment of the invention.

As in the first embodiment, the coding module 710 can be implemented according to the first, the second or the third alternative disclosed hereinabove.

It differs however from the preceding one in that the coding module 710 uses a systematic code. In other words, the codeword $S_n^1, \ldots, S_n^K$ encoding the bit $b_n$ contains this bit: $\exists k$ such that $S_n^k = b_n$, $\forall n$. It also differs in that the decoding module is here absent, the systematic output, i.e. that of the basic shift register $730_k$ being used directly. Thus, for example, it can be noted that the shift register shown in FIG. 6 is able to be implemented according to the second embodiment of the invention, with the sequence of bits at the output of the register $630_1$ being identical to the sequence of the input bits.

Figure 8:
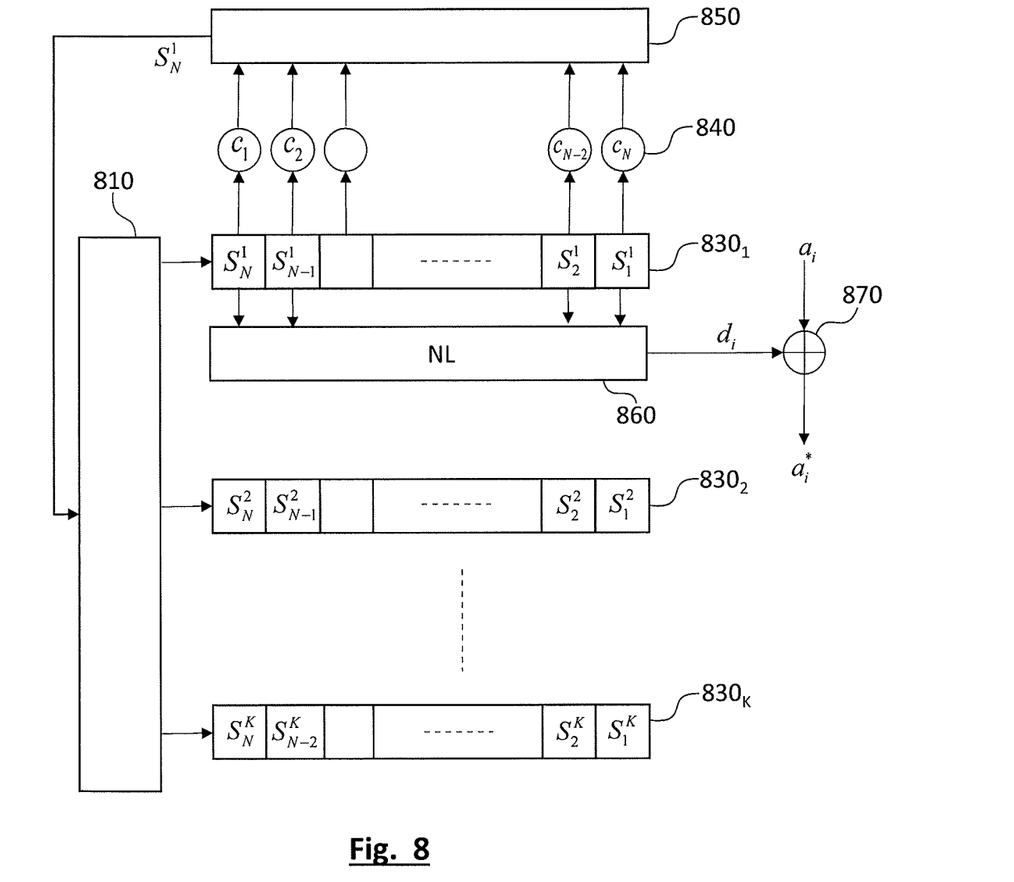
FIG. 8 diagrammatically shows a stream cipher circuit that uses a shift register protected against physical attacks according to the second embodiment of the invention.

FIG. 8 diagrammatically shows a stream cipher circuit that uses a shift register protected against physical attacks, according to the second embodiment of the invention.

It should be noted that a shift register according to the first embodiment of the invention could alternatively be used, at the price of greater complexity (provision of the decoding module) but with the advantage of the associated error detection.

In FIG. 8, the coding module 810 uses a systematic code such as the module 710 of FIG. 7. Only the basic shift register, here $830_1$, corresponding to the systematic output is used to generate the key stream cipher. The contents of the memory cells of the basic shift register in question are respectively multiplied in 840 by the binary coefficients $c_1, c_2, \ldots, c_N$ of a primitive polynomial and added in the binary added (XOR) 850 in order to provide the bit at the input of the coding module:

$$b_n = \sum_{i=1}^{N} c_{N-i+1} S_i^1 = \sum_{i=1}^{N} c_{N-i+1} b_i$$

Moreover, the bits of the basic register $830_1$, or even only some of them, can be combined by means of a combination module 860 (for example logic gate) that implements a non-linear function NL in order to provide a key stream cipher $d_1, \ldots, d_M$.

The sequence of bits to be encrypted $a_1, \ldots, a_M$ forming the unencrypted message and the key stream cipher are added by the logic adder 870 in order to supply the encrypted message $a_1^*, \ldots, a_M^*$, with $a_1^* = a_i + d_i$.

In practice, it is possible to use a plurality of shift registers protected against physical attacks such as the one shown in FIG. 8 and certain bits of each one of the basic registers corresponding to their respective systematic outputs will be combined in order to obtain the key stream cipher. For example, each one of these basic registers will be associated with a non-linear combination module and the sequences at the output of these non-linear combination modules will be added together. Alternatively, the non-linear combination module could be mutualized between these basic registers and receive certain bits of each one of them in order to form the key stream cipher.

The invention claimed is:

1. A shift register protected against physical attacks, characterized in that it comprises a coding module receiving input bits and encoding, at each clock cycle, an input bit ($b_{in}$) into a codeword of size K>1, a pluraliy K of basic shift registers ($330_1, \ldots, 330_K$) each comprising the same number N>2 of memory cells, with each basic shift register receiving as input one bit ($S_n^k$) of the codeword and supplying one bit of a word to be decoded of size K in order to generate one output bit ($b_{out}$), with the codewords being chosen in such a way as to all have the same non-zero Hamming weight and each pair of consecutive codewords having the same non-zero Hamming distance.

2. The shift register according to claim 1, wherein the coding implemented by the coding module is a systematic coding, with the output bit being the systematic bit of the word to be decoded and being supplied by one of the basic registers.

3. The shift register according to claim 1, further comprising a decoding module of which the inputs are connected to the respective outputs of the K basic shift registers, and decoding the word to be decoded in order to supply the output bit.

4. The shift register according to claim 1, wherein the coding module comprises an internal state machine, with each state being associated with a codeword, the state machine passing at each clock cycle from a current state to a following state according to the current state and the input bit, with the codeword generated by the coding module being the one associated with the following state.

5. The shift register according to claim 1, further comprising an external state machine, clocked by said clock and cyclically running through a sequence of states, with the codeword generated by the coding module being a function of the input bit and of the current bit of the state machine.

6. The shift register according to claim 5, wherein the external state machine is a synchronous binary counter.

7. The shift register according to claim 6, wherein the counter supplies a parity in the number of clock cycles using an initialization instant, with the codeword generated by the coding module being a function of the input bit and of said parity.

8. The shift register according to claim 3, wherein when the decoding module determines that the word to be decoded is not a codeword, it generates an error signal.

9. A stream cipher circuit, comprising at least one shift register according to claim 2, the basic shift register corresponding to the systematic bit comprising a linear feedback by means of coefficients of a primitive polynomial, with the bit resulting from the linear feedback being used as an input bit for the coding module, with the bits stored in the basic shift register corresponding to the systematic bit, or only some of them, being combined in a non-linear combination module in order to supply a key stream cipher, with a sequence of bits ($a_1, \ldots, a_N$) to be encrypted being added to the key stream cipher ($d_1, \ldots, d_N$) in order to supply a stream cipher sequence ($a_1^*, \ldots, a_N^*$).

\* \* \* \* \*